Figure 1A:
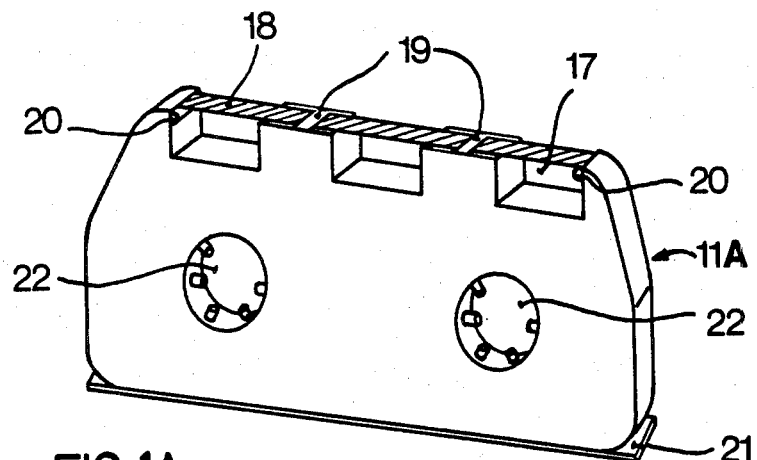

United States Patent [19]

Bettinger et al.

[11] 4,396,169

[45] Aug. 2, 1983

[54] MAGNETIC TAPE CASSETTE

[75] Inventors: Günter Bettinger, Schifferstadt; Norbert Kreimes, Ludwigshafen, both of Fed. Rep. of Germany

[73] Assignee: BASF Aktiengesellschaft, Ludwigshafen, Fed. Rep. of Germany

[21] Appl. No.: 238,628

[22] Filed: Feb. 26, 1981

[30] Foreign Application Priority Data

Mar. 27, 1980 [DE] Fed. Rep. of Germany ... 8008439[U]

[51] Int. Cl.³ .......................... G03B 1/04; G03B 15/32
[52] U.S. Cl. ..................................... 242/199; 242/204
[58] Field of Search ................................ 242/197–200, 242/204; 360/96, 93, 132

[56] References Cited

U.S. PATENT DOCUMENTS 3,851,840 12/1974 Bastiaans .............................. 242/198
4,013,160 3/1977 Colecchi et al. ..................... 242/199
4,022,401 5/1977 Kishi .................................... 242/198

FOREIGN PATENT DOCUMENTS 2245318 3/1973 Fed. Rep. of Germany.
430440 1/1975 U.S.S.R. .............................. 242/198

Primary Examiner—Leonard D. Christian
Attorney, Agent, or Firm—Keil & Witherspoon

[57] ABSTRACT

A container for two rolls of tape-like material, especially a magnetic tape cassette, includes, as braking means, two curved levers which project from the container, are connected together and can be released from outside the container.

In a special embodiment according to the invention, the container is a protective holder for two rolls of tape-like material, which holder can be used in a precision cassette housing for operation on a transport apparatus. The braking means provide the greatest possible protection for the rolls of tape-like material and the material itself, which is of importance particularly in the case of thin magnetic tapes.

The braking system can in principle be used for all types of magnetic tape and film cassette.

8 Claims, 4 Drawing Figures

MAGNETIC TAPE CASSETTE

The present invention relates to a container for two rolls of tape-like material, particularly a magnetic tape cassette, which consists essentially of an approximately right parallelepipedal casing having a bottom wall, a top wall and side walls which enclose the rolls of tape-like material (hereinafter referred to as "tape"), and includes pivotally mounted braking means for the rolls of tape, which braking means can be actuated from outside the container, in order to release the rolls for operation.

It is known to brake tape rolls and thus to prevent the tape from unwinding, particularly in the case of thin and sensitive materials such as magnetic tapes.

In a magnetic tape cassette described in U.S. Pat. No. 3,800,322 the functions of tape tensioning levers and a common brake member for the tape reels are so combined that the tape tensioning levers are released prior to the brake member by means of an actuating element entering the cassette.

From German Pat. No. 2,245,318, which discloses another type of magnetic tape cassette, it is known to guide and to brake the tape rolls with the aid of two pairs of frame-like elements, and to simultaneously actuate the two pairs of elements by means of members projecting from the cassette, in order to release the rolls of tape for operation.

In the prior art magnetic tape cassettes, the reels carrying the rolls of tape, and the brake members are provided with toothed sections, as a result of which the cassettes are very uneconomical to manufacture.

A novel cassette system has been proposed in U.S. Pat. No. application Ser. No. 212,630 filed Dec. 3, 1980 of Reimer et al.

The object of the invention described in the said application is to provide a high-quality cassette for a tape-like recording medium, in particular a magnetic tape cassette, which offers very precise guidance of the recording medium and enables the medium to be exchanged.

Specifically, the system comprises a cassette for a recording medium in strip or tape form, particularly a magnetic tape, consisting of an approximately right parallelpipedal housing with openings serving to admit the drive members and scanning means on the transport apparatus, the scanning means cooperating with the recording medium which is located inside the housing, is wound on at least one hub to form a roll (the hub and the roll of medium in combination being referred to hereinafter as "reel"), is guided in the housing by guide means and is driven by means of the drive members, wherein the reel and the housing are separate units, which can be brought together for operation, the reel being located, at least when outside the housing, in a protective holder which enables the reel and the recording medium to be introduced into the housing in the correct position, and wherein the housing is provided with opening and closing means and with means for inserting the reel and the recording medium into it in the correct position.

In this way, complete interchangeability of the recording medium (hereinafter also referred to as "tape") is achieved, since the housing and the protective holder can be marketed separately. Not only does this offer the choice of different tape lengths and of different tape properties (photographic or magnetic), but it also permits optimum combination of products from different manufacturers, for example in order to achieve special audio or video effects or to meet special requirements in data signal storage or instrumentation signal storage.

The invention offers both the amateur and the professional user, in the case of all types of signals, an improvement in recording/playback quality, and a higher recording density, which in turn facilitates digital signal coding and offers greater storage capacity. The protective holder is in particular easy for amateurs to handle and is advantageously of a form suitable for filing in a library; it is made of a suitable material, and has an appropriate shape for protecting the tape adequately from external damage.

The housing is advantageously made of a more rigid material than the holder, is also easy to handle, especially for the amateur, and offers substantially constant highly accurate tape guidance when used in a transport apparatus conjointly with the tape, which is either within the protective holder or has been taken out of the latter.

The housing may include parts which are used on present-day commercial transport apparatus; such parts may originate directly from the apparatus production. Advantageously, the housing should be able to be mass-produced economically.

When a film is used as the recording medium, either the type of film or the sensitivity of the film material or a special contrast or color effect may be the criterion dictating an exchange of film.

The reel or reels is/are at least part of the time accomodated in a protective holder, which is preferably flat and closed substantially on all sides.

Such a holder can be produced economically from plastic and/or paper, advantageously, in the case of plastics, by thermoforming, injection molding or compression molding or, in the case of paper, by other suitable mass production methods, for example pressing. The shape of the holder should be such as to allow simple and, preferably, automatic fitting of the tape into the holder.

A housing for such a holder, or for the recording medium taken from such a holder, may consist of a bottom and a lid which are lockably connected or connectable. This permits simple insertion and removal of the protective holder or of the recording medium taken therefrom, and ensures completely satisfactory operation of the cassette when the housing has been locked.

Advantageous embodiments of the protective holder and of the housing according to the present invention and incorporating the above features are described below.

The protective holder for at least one reel comprises at lease one recess of a shape and size corresponding to those of a reel of the maximum intended diameter. A protective holder for two reels can also have a recess of a size and shape corresponding to those of two reels of half the maximum intended diameter. The protective holder is advantageously produced from a suitable plastic, such a rigid polyvinyl chloride, and consists of one or more thermoformed or injection-molded parts.

An object of the present invention is to provide a simple container for two rolls of tape, which has effective braking means that are economical to manufacture, so that it is possible to mass-produce the container.

We have found that this object is achieved by a container of the above-described type, wherein the braking means consist of two levers which are connected together and, in their operational position, bear against the peripheral surfaces of the rolls of tape, and which project from the container through at least one opening therein, so that they can be released from outside the container.

Containers according to the present invention are simple to manufacture and can be used for storing a large variety of different materials, e.g. paper tape, films and magnetic tapes.

Each lever advantageously has a curved portion, preferably provided with a piece of non-slip material, the radius of which portion corresponds to at least the maximum tape roll radius.

In a further embodiment of the invention, each lever has an actuating portion, the actuating portions of the two levers being connected together.

In a practical embodiment, to produce the braking force, spring means are provided which press the two levers against the rolls of tape. The spring means preferably consist of a tension spring which is arranged between the levers.

Further details of the invention are disclosed in the following description of the embodiments illustrated in the accompanying drawings, in which:

FIG. 1A is a schematic perspective view of a container according to the invention comprising an optionally detachable book-like spine.

Figure 1B:
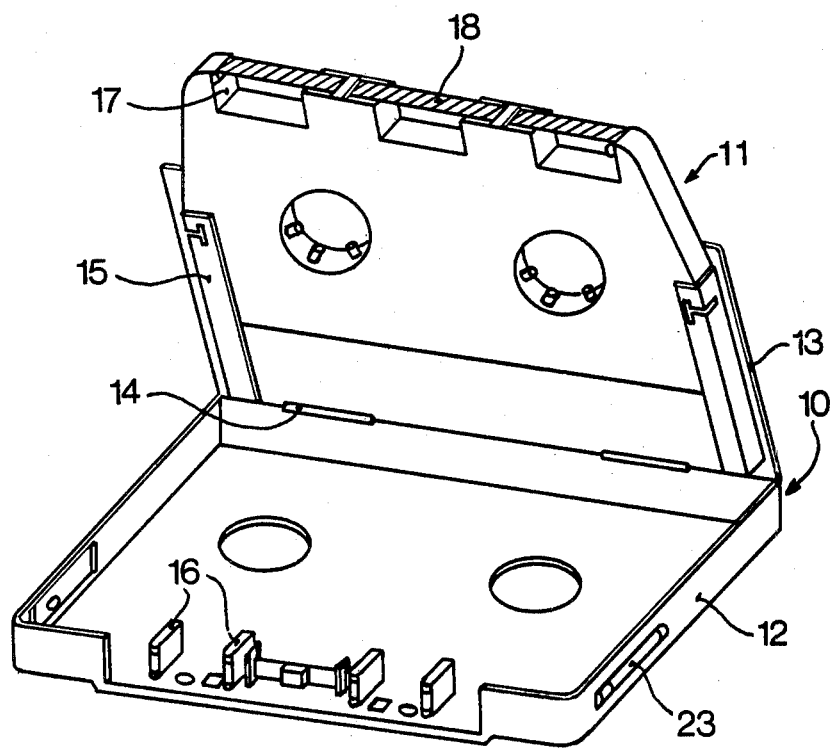
Figure 1C:
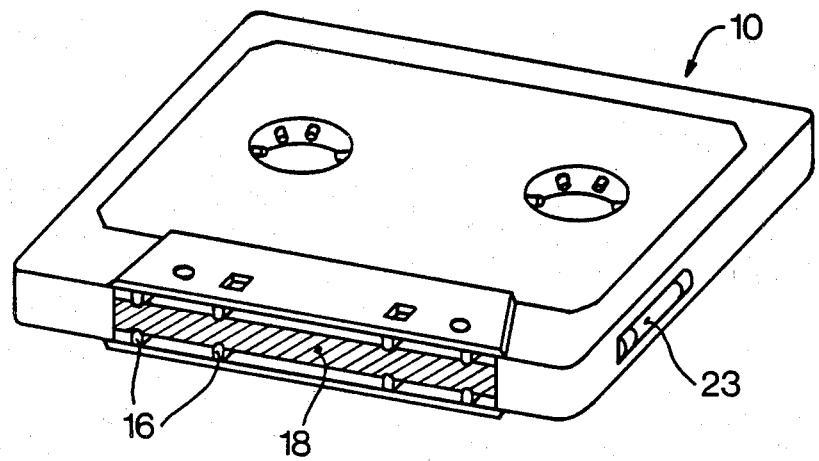
Figure 2:
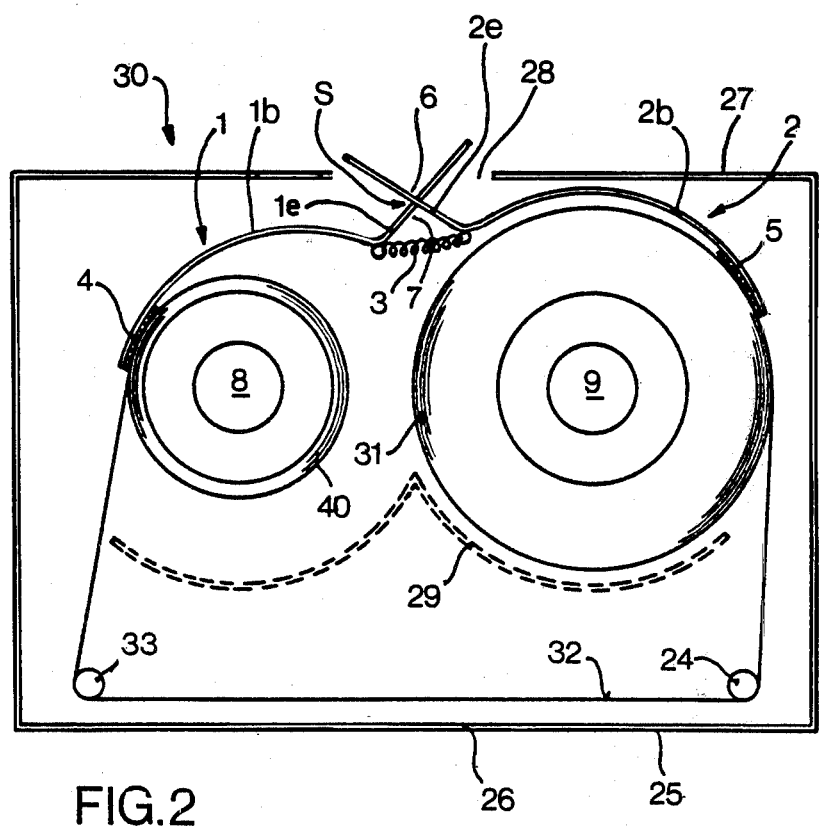

FIG. 1B shows the container of FIG. 1A with the spine removed, partially inserted into a housing having the external shape of a compact cassette, FIG. 1C is a schematic perspective view of the closed housing containing the container of FIG. 1B, and FIG. 2 is a schematic plan view of a novel container with two coplanar rolls of tape and braking means according the the invention, with the top removed.

Container 11, 11A, 30 may be any kind of cassette, such as a magnetic tape cassette, e.g. a compact cassette, or a film cassette or a cassette for paper tape or inked ribbon. The container may also simply serve as a protective holder for rolls of magnetic tape, which holder or rolls must be inserted into a cassette housing for operation on a tape transport apparatus. In every instance there are provided two rolls 40 and 31 of tape-like material that is wound respectively on hubs 8 and 9 (which may or may not be flanged) and should not unwind unintentionally. Tape 32 extends from the periphery of one roll to the periphery of the other roll, being guided over suitable guide members 33 and 24.

The novel braking means comprise levers 1 and 2 each consisting of a curved portion 1b, 2b and an actuating portion 1e, 2e. A tension spring 3, e.g. a helical spring, is fastened to eyes on actuating portions 1e and 2e. The pivotal connection between the actuating portions can for example be an ordinary hinge comprising sleeves and a pivot which may be stationary. In the illustrated embodiment, the levers 1 and 2 are made for example from strips of sheet metal, e.g. strips of brass, and joined together to form a cross, each lever being provided for example with a slot so that the two levers can fit into one another. The point at which the levers cross also constitutes the pivot point S, the position of which is determined by two positioning pins 6 and 7.

The sides of curved portions 1b and 2b which face toward the rolls are advantageously provided with pieces of non-slip material 4 and 5 respectively, which material must suit the tape material and not damage the surface thereof. Soft rubber or a plastics foam of similar softness, such as a soft polyurethane, is for example suitable for magnetic tape. The dimensions of the said pieces of non-slip material should be so chosen that the compressive forces exerted by the spring are spread over a relatively large peripheral area.

An opening 26 is provided approximately in the middle of the front wall 25, for the admission of means for scanning tape tape 32, and there is provided in the rear wall 27 an opening 28 through which the ends of actuating portions 1e an 2e project from the container 30, so that they can be readily actuated by hand or by an actuating member on a cassette housing or a transport apparatus upon insertion of the container therein. Actuation of the lever portions 1e and 2e by pressing the ends thereof together or apart, depending on the location of the hinge means and the position and type of spring 3, lifts the curved portions 1b and 2b off the rolls 40 and 31 so that they are free to rotate. The rolls are rotated by means of winding spindles which pass through holes in the top and bottom walls of the container 30 and enter the central openings in the hubs. In another embodiment of the container (not shown), the rolls are driven by at least one capstan which is in contact with their peripheral surfaces.

As a result of the advantageous design and arrangement of the braking means according to the invention, the levers automatically conform to the varying roll diameters, and exert a radial pressure on the peripheral surfaces of the rolls, a counterpressure being produced by the bearings for the hubs 8 and 9 or by, for example, arcuate webs 29 (shown in dashed lines in FIG. 2) which serve as stops for the rolls, whereby unwinding of the rolls and consequently the formation of loops is prevented.

Levers 1 and 2 can of course be made from any other suitable material, e.g. polyamide or polystyrene. It is also possible to employ the pivotally mounted curved tape guide elements used in prior art compact cassettes, as brake levers.

FIG. 1C is a perspective view of a cassette which has the dimensions set forth in DIN No. 45,516 and is intended to serve the same purposes as a conventional compact cassette.

However, in contrast to conventional compact cassettes, the housing 10 is a precision-made part which is designed to receive a container 11 for two reels (FIG. 1B).

The housing 10 (FIGS. 1C and 1B) is preferably made from a material which lends itself to mass-production and retains its shape over a wide temperature range. The housing 10 consists of two parts, the bottom 12 and the lid 13, which in the present case are movably connected by hinges 14. The hinges 14 are fixed to the rear wall of the bottom 12 and to the rim of the flat lid 13. Container 11 is shown partially inserted into the guide rails 15 on the underside of the lid. After the container 11 has been inserted and the lid 13 has been closed, tape guide rolls or projections 16 enter the recesses 17 in the container 11, over which rolls or recesses the tape 18 is tensioned by means of retaining members 19, and the actuating portions 1e and 2e of the levers 1 and 2 are actuated, as not particularly shown, through the rear wall of the housing 10. Pins or rolls 20 are provided on the container 11 or 11A, at the outer ends of the left-hand and right-hand recesses 17. Advantageously, the interior of the container 11A is sealed off from the outside at these points, as shown in FIG. 1A, so as to provide protection against dust and dirt.

The size and shape of the container 11, presently being discussed, is determined by, for example, the maximum reel diameter if the container, when used in conjunction with the housing 10, is to remain within the latter. In this case, the container 11 may be made from a suitable material in one piece or from two firmly connected parts.

The container 11A in FIG. 1A can be provided with a book-like spine 21, which may for example be detachable and which has a length corresponding to the length of the container, so that the latter can be stood upright. The spine can be designed to be written upon, for filing purposes.

In a particular embodiment, the container 11 or 11A consists of two parts which may be symmetrical or unsymmetrical with respect to the median plane of the container, though a symmetrical shape greatly facilitates mass production. The container 11 or 11A is advantageously made of a plastics material, for example from a sheet of polystyrene, polyethylene or, preferably, rigid polyvinyl chloride, the sheet material being optionally bonded to paper or cardboard, and the parts of the container being joined together in a suitable manner, for example by welding. The retaining members 19 and/or guide pins or axles for guide rolls 20 can be suitably attached to one or both parts of the container, for example by driving them into the material. The retaining members 19, guide pins and rolls 20 should consist of a non-magnetic material which has little tendency to build up static charge. During recording and playback, the container 11, 11A is inside the housing 10, and one or more magnetic heads are pressed against the unsupported spans of tape over the recesses 17, the compressive force determining the wraparound angle on the head. The reels, which are within the container 11, are driven by winding spindles on the transport apparatus which enter the openings 22 in the hubs.

In FIGS. 1B and 1C, actuating means 23 for a locking device for the bottom 12 and lid 13 are shown on a sidewall of the housing.

We claim:

1. A container for two rolls of tape-like material, particularly a magnetic tape cassette, comprising an approximately right parallelepipedal casing which has a bottom wall, a top wall and side walls enclosing the rolls of tape-like material, and which has a plurality of openings therein, and braking means for said rolls,
    said braking means including two mutually crossing double-arm brake levers, each lever having a first end and a second end, means for holding said levers in said container for pivotal movement with respect to each other, means normally urging the first ends of said levers toward each other so as to bear against the peripheral surfaces of said rolls, the second ends of said levers projecting from said container through at least one of said openings so that said ends are actuable from the outside of said container to cause the first ends of said levers to be spread apart and hence lifted off said peripheral surfaces so as to release said rolls for operation.

2. A container as claimed in claim 1, wherein each lever at its first end has a curved portion, the radius of which corresponds to at least the maximum radius of the rolls.

3. A container as claimed in claim 1 or 2, wherein said urging means are in the form of spring means which normally press the first ends of the two levers against the rolls.

4. A container as claimed in claim 3, wherein a tension spring is provided between the two levers.

5. A cassette arrangement for a recording medium in strip or tape form, particularly a magnetic tape, for use with a recording and/or playback apparatus having drive means and scanning means,
    said cassette arrangement comprising two separate components, viz. an approximately rectangular cassette housing and a protective reel-container,
    both said cassette housing and said container having a plurality of openings including openings for admitting said drive means and scanning means and, in one of said plurality of openings which is located adjacent the front of said components, guide means for said recording medium, and said housing having opening and closing means and means for receiving, when said housing is open, said reel container in a predetermined position, and
    said reel container accommodating the hubs on which said recording medium is wound to form two reels in locations such as to permit, in cooperation with said receiving means, introduction of said reels into the open cassette housing in the correct position for operation, and said reel container having braking means including two mutually crossing double-arm brake levers, each said lever having a first end and a second end, means for holding said levers in said container for pivotal movement with respect to each other, means normally urging the first ends of said levers toward each other so as to bear against the peripheral surfaces of said reels, the second ends of said levers projecting from said container through at least one of said plurality of openings so that said ends are actuable from the outside to cause the first ends of said levers to be spread apart and hence lifted off said peripheral surfaces so as to release said reels for operation.

6. A cassette arrangement as claimed in claim 5, wherein each lever at its first end has an arcuate portion the radius of which corresponds to at least the maximum radius of the reels.

7. A cassette arrangement as claimed in claim 5 or 6, wherein said urging means are in the form of spring means which normally press the first ends of the two levers against the reels.

8. A cassette arrangement as claimed in claim 7, wherein a tension spring is provided between the two levers.

* * * * *